(12) United States Patent
Park et al.

(10) Patent No.: US 11,789,184 B2
(45) Date of Patent: Oct. 17, 2023

(54) LENS MODULE AND CAMERA MODULE INCLUDING THE SAME

(71) Applicant: Samsung Electro-Mechanics Co., Ltd, Suwon-si (KR)

(72) Inventors: Seong Chan Park, Suwon-si (KR); Eun Jung Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 248 days.

(21) Appl. No.: 17/184,901

(22) Filed: Feb. 25, 2021

(65) Prior Publication Data

US 2022/0155496 A1 May 19, 2022

(30) Foreign Application Priority Data

Nov. 19, 2020 (KR) ........................ 10-2020-0155174

(51) Int. Cl.
| | | |
|---|---|---|
| *G02B 3/00* | (2006.01) | |
| *G02B 7/02* | (2021.01) | |
| *G02B 1/04* | (2006.01) | |
| *G03B 30/00* | (2021.01) | |

(52) U.S. Cl.
CPC ........... *G02B 3/0087* (2013.01); *G02B 1/041* (2013.01); *G02B 7/021* (2013.01); *G03B 30/00* (2021.01); *G02B 2207/101* (2013.01)

(58) Field of Classification Search
CPC ...... G02B 3/0087; G02B 1/041; G02B 7/021; G02B 2207/101; G02B 9/12; G02B 13/0055; G02B 13/001; G02B 13/0015; G03B 30/00; G03B 17/12; H04N 5/2254

See application file for complete search history.

(56) References Cited

U.S. PATENT DOCUMENTS 5,166,827 A * 11/1992 Noda .................. G02B 3/0087
359/652
6,236,493 B1 5/2001 Schmidt et al.

FOREIGN PATENT DOCUMENTS

| | | | | |
|---|---|---|---|---|
| JP | 2000-508783 A | | 7/2000 | |
| JP | 2013-61548 A | | 4/2013 | |
| JP | 2013061548 A | * | 4/2013 | ............. G02B 13/18 |
| JP | 5709657 B2 | | 4/2015 | |
| JP | 2015-92201 A | | 5/2015 | |
| KR | 10-2012-0005704 A | | 1/2012 | |
| KR | 10-1787215 B1 | | 10/2017 | |
| WO | WO 2013/125179 A1 | | 8/2013 | |
| WO | WO-2013125179 A1 | * | 8/2013 | ........... B29C 41/045 |

OTHER PUBLICATIONS

Machine translation of WO-2013125179-A1 (Year: 2013).*
Machine translation of JP-2013061548-A (Year: 2013).*

(Continued)

*Primary Examiner* — Darryl J Collins
*Assistant Examiner* — Matthew Y Lee
(74) *Attorney, Agent, or Firm* — NSIP Law

(57) ABSTRACT

A lens module is provided. The lens module includes at least one refractive index distribution lens; and a lens barrel configured to accommodate the at least one refractive index distribution lens, wherein the at least one refractive index distribution lens is composed of a single layer, and includes a plastic material.

19 Claims, 7 Drawing Sheets

(56) References Cited

OTHER PUBLICATIONS

Jong-Ung Lee et al. "Optical System Design Composed of Spherical SELFOC Lens and Aspherical Plastic Lens for Mobile Phone Camera." *Korean Journal of Optics and Photonics* 19.2 (Apr. 2008): 108-115. (9 pages in Korean).
Korean Office Action dated May 24, 2022, in counterpart Korean Patent Application No. 10-2020-0155174 (5 pages in English and 4 pages in Korean).

* cited by examiner

I – I'

I - I'

LENS MODULE AND CAMERA MODULE INCLUDING THE SAME

CROSS-REFERENCE TO RELATED APPLICATION(S)

This application claims the benefit under 35 USC § 119(a) of priority to Korean Patent Application No. 10-2020-0155174 filed on Nov. 19, 2020, in the Korean Intellectual Property Office, the entire disclosure of which is incorporated herein by reference for all purposes.

BACKGROUND

1. Field

The following description relates to a lens module and a camera module including the same.

2. Description of Related Art

Recently, camera modules have been typically implemented in mobile communication terminals such as, but not limited to, smartphones. In accordance with the trend for high piexelation of smartphone cameras, it is beneficial to shorten and lighten the lens module, a key component of the camera module. It is also beneficial to improve the development of the module structure, and improve the performance of a lens material. The camera modules of current mobile devices requiring high resolution also typically implement a combination of 6 or more aspherical lenses. The combination of implementing a plurality of aspherical lenses may result in an increase in manufacturing costs assembling of the lens due to an increase in the number of lenses used, and may also result in an increase in manufacturing and quality costs according to the need for a high-level of assembly alignment. Additionally, a large amount of lenses may be detrimental to achieving a slim form factor for the camera module in response to a demand for the thinning of mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens module includes at least one refractive index distribution lens; and a lens barrel, configured to accommodate the at least one refractive index distribution lens, wherein the at least one refractive index distribution lens is composed of a single layer, and comprises a plastic material.

A maximum refractive index of the at least one refractive index distribution lens may be equal to or greater than 1.75.

A difference between a maximum refractive index and a minimum refractive index of the at least one refractive index distribution lens may be equal to or greater than 0.2.

The at least one refractive index distribution lens may include an organic polymer and inorganic particles.

The organic polymer may include at least one of polycarbonate (PC) and polymethylmetacrylate (PMMA).

A refractive index of the inorganic particles may be equal to or greater than 2.0.

A diameter of the inorganic particles may be less than or equal to 10 nm.

The inorganic particles may include at least one or more of $ZrO_2$, $TiO_2$, $ZnS$, $BaTiO_3$, Si, and $WO_3$.

A content distribution of the inorganic particles may be continuously changed within the at least one refractive index distribution lens.

The at least one refractive index distribution lens may have a continuously changed refractive index.

The at least one refractive index distribution lens may have a continuously increased, or continuously decreased, refractive index.

The lens module may further include a plurality of lenses configured to be accommodated in the lens barrel.

At least one of the plurality of lenses may include an organic polymer and inorganic particles.

In a general aspect, a camera module includes a lens barrel, configured to accommodate at least one refractive index distribution lens; a housing, including the lens barrel; and an image sensor module, coupled to the housing, wherein the at least one refractive distribution lens is composed of a single layer, and comprises a plastic material.

The at least one refractive index distribution lens may include an organic polymer and inorganic particles.

The at least one refractive index distribution lens may have a continuously changed refractive index.

In a general aspect, as electronic device includes a camera module, including a housing; at least one single-layer refractive index distribution lens disposed in the housing; and at least one lens disposed in the housing; wherein the at least one refractive index distribution lens and the at least one lens are composed of a plastic material.

The at least one refractive index distribution lens may include an organic polymer and an inorganic particle.

The at least one refractive index distribution lens may be disposed at an object-side surface of the camera module, and the at least one lens is disposed at an image-side surface of the camera module.

Other features and aspects will be apparent from the following detailed description, the drawings, and the claims.

Figure 1:
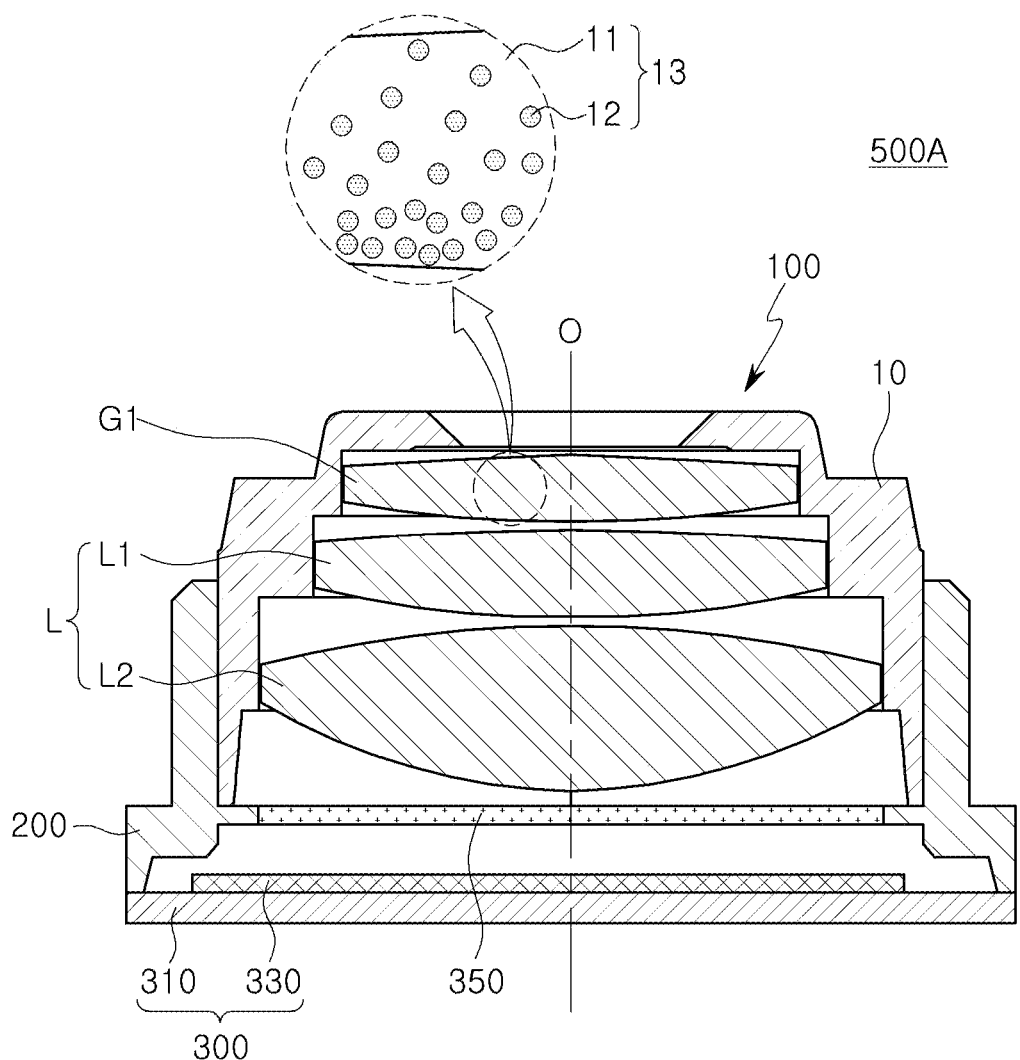
FIG. 1 is a cross-sectional view of an example camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

When defining terms for directions, an optical axis direction is a vertical direction based on a lens barrel 10.

Figure 2:
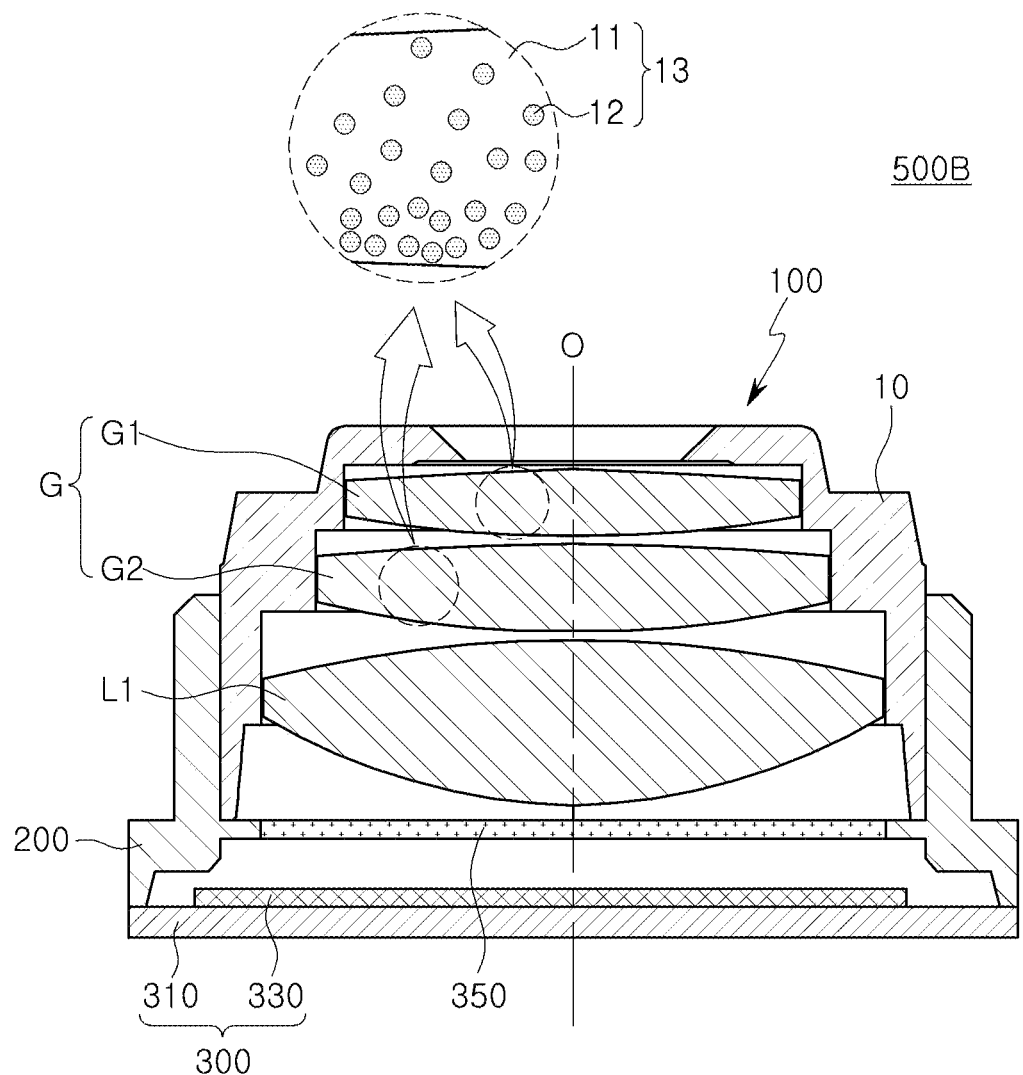
FIG. 2 is a cross-sectional view of an example camera module, in accordance with one or more embodiments.

FIG. 1 is a cross-sectional view of an example camera module, in accordance with one or more embodiments, and FIG. 2 is a cross-sectional view of an example camera module, in accordance with one or more embodiments.

Referring to FIG. 1, an example camera module 500A, in accordance with one or more embodiments, includes a lens module 100, a housing 200, and an image sensor module 300.

The lens module 100 is accommodated in the housing 200. In an example, the housing 200 may have open upper and lower portions, and the lens module 100 is accommodated in an internal space of the housing 200.

The image sensor module 300 may be disposed below the housing 200. The image sensor module 300 is a device that converts light incident through the lens module 100 into an electrical signal. In an example, the image sensor module 300 may include a printed circuit board 310, and an image sensor 330 connected to the printed circuit board 310, and may further include an infrared filter 350.

The infrared filter 350 may block light in an infrared region among the light incident through the lens module 100. The image sensor 330 converts light incident through the lens module 100 into an electrical signal. In a non-limited example, the image sensor 330 may be a charge coupled device (CCD) and a complementary metal-oxide semiconductor (CMOS). The electrical signal converted by the image sensor 330 is output as an image through a display unit. The image sensor 330 may be fixed to the printed circuit board 310, and may be electrically connected to the printed circuit board 310 by wire bonding.

Hereinafter, each configuration of the examples will be described in more detail.

The lens module 100 may include a lens barrel 10, a refractive index distribution lens G disposed inside the lens barrel 10, and a plurality of lenses L.

The lens barrel 10 may have a cylindrical shape so that at least one lens L configured to image a subject may be accommodated therein. In an example, the subject may be disposed above, or in front of, the camera module 500A based on FIG. 1, and the refractive index distribution lens G and the plurality of lenses L may be disposed inside the lens barrel 10 along an optical axis.

The refractive index distribution lens G and/or the plurality of lenses L inside the lens barrel 10 may include an optical portion and a flange portion. The optical portion may be configured to refract light reflected from a subject, and the flange portion may be configured to fix a lens to the lens barrel 10.

When a plurality of refractive index distribution lenses G and/or a plurality of lenses L are disposed, the refractive index distribution lenses G and/or the plurality of lenses L may have different diameters, respectively, and the lens barrel 10 may have a stepped inner surface to accommodate refractive index distribution lenses G and a plurality of lenses L having various diameters. Additionally, the refractive index distribution lenses G and/or the plurality of lenses L may have different shapes from each other.

In the example of FIG. 1, the refractive index distribution lens G and the plurality of lenses L may have a convex shape. However, this is only an example, and the plurality of lenses L may have different shapes, including a concave shape or an unevenness shape, depending on the purpose and implementation.

In an example, the lens barrel 10 may be formed to have an inner diameter of various widths.

The refractive index distribution lens G and/or the plurality of lenses L may be sequentially stacked inside the lens barrel 10 to be configured. Referring to FIG. 1, in the example, three lenses G1, L1, and L2 are depicted. However, the three lenses G1, L1, and L2 is only an example, and the examples may include at least three lenses, or less than three lenses.

In an example, depending on the resolution to be implemented, a larger number of lenses may be included, or a smaller number of lenses may be further included.

The refractive index distribution lens G is called a Gradient index (GRIN) lens, and there is a continuous change in a refractive index in a lens material in the refractive index distribution lens G. That is, in the refractive index distribution lens G, the refractive index within the lens may have a gradient, a slope, or an inclination, and may change continuously.

Additionally, a direction in which the refractive index has an inclination is not limited thereto, and may increase from a first surface of the refractive index distribution lens G toward a second surface, or may decrease from a first surface of the refractive index distribution lens G toward a second surface, and may change irregularly inside the lens G.

Irradiated light or light rays are continuously bent in the refractive index distribution lens G, and focusing characteristics may be determined by variations of the refractive index in a lens material. Compared to a structure in which a plurality of lenses having different refractive indices are disposed for a change in refractive index in the past, the number of lenses implemented may be reduced by using the refractive index distribution lens G according to the examples, and accordingly, the thickness of the entire lens module 100 may be reduced, such that the entire component may be thinned.

In the example of the refractive index distribution lens G, a maximum refractive index ($RI_{max}$) may be 1.75 or more, and a difference in refractive indices between the maximum refractive index ($RI_{max}$) and a minimum refractive index ($RI_{min}$) is 0.1 or more, preferably 0.2 or more. However, the examples are not limited thereto.

In the examples, by using the refractive index distribution lens G in the mobile camera modules 500A and 500B, a difference in refractive indices may be obtained, while reducing the number of lenses in the camera module.

The plurality of lenses L may include respective lenses L1 and L2, and may be typical lenses having a constant refractive index unlike the refractive index distribution lens G described above.

In the example of FIG. 1, the plurality of lenses L are shown to include a refractive index distribution lens G1 and lenses L1 and L2. However, in some examples, a single-layer refractive index distribution lens G1 may be implemented without the lenses L1 and L2. In this example, the module may have a structure of the lens module 100 including a single-layer refractive index distribution lens G1 instead of a plurality of lenses.

Additionally, in the example of FIG. 1, a structure in which a refractive index distribution lens G1, a lens L1, and a lens L2 are sequentially disposed from an object side to an imaging side may be implemented. However, in examples, the disposition of each lens of the plurality of lens may be arbitrarily changed according to the respective examples. In an example, the refractive index distribution lens G1 may also be disposed between the plurality of lenses L.

In the lens module 100, and camera modules 500A and 500B (FIG. 2) according to the examples, the refractive index distribution lens G, and the plurality of lenses L, may include a plastic material. In the example of the refractive index distribution lens (G) and a plurality of lenses L of the examples including a plastic material, compared to a lens including a glass material, there is an advantage in that a weight may be much lighter, and also in terms of costs, production costs may be lowered, thereby achieving an effect of improving productivity.

Figure 3:
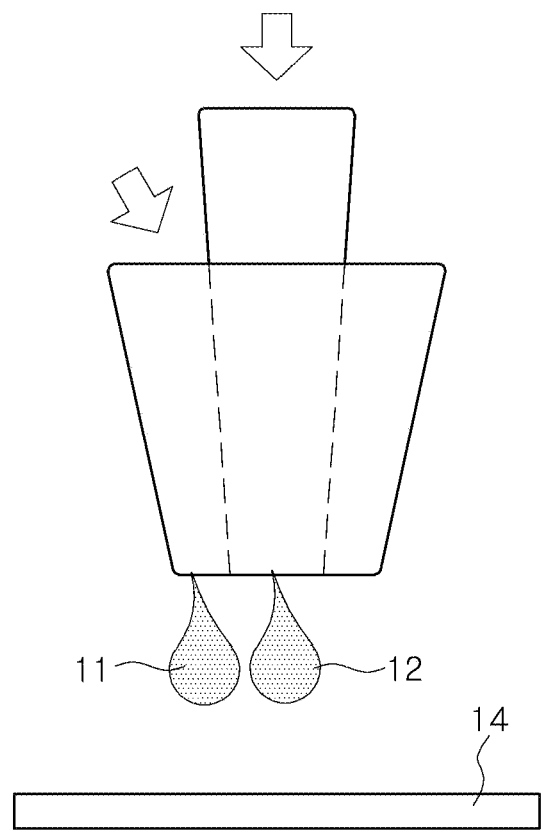
FIG. 3 is a flowchart illustrating a process of manufacturing a portion of lenses, in accordance with one or more embodiments.
Figure 4:
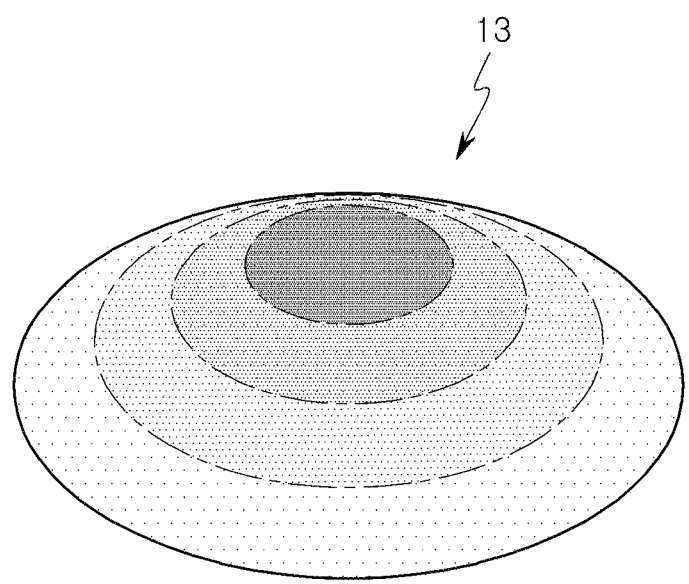
FIG. 4 is a perspective view illustrating a portion of lenses, in accordance with one or more embodiments.

Additionally, referring to FIGS. 3 and 4, with respect to a specific material of the refractive index distribution lens G according to the examples, the refractive index distribution type lens G, including a plastic material, may include an organic-inorganic composite 13, which is a composite of an organic polymer 11 and an inorganic particle 12, and each of the organic polymer 11 and the inorganic particle 12 may be an optical polymer and an inorganic nanoparticle.

Additionally, the refractive index distribution lens G, according to the examples, may have a structure which has a refractive index slope by nanoscale particles embedded in an organic matrix, and nanoscale particles dispersed in a liquid curable matrix may be cured using a potential difference so as to be moved within the matrix, thereby forming a refractive index slope.

Additionally, the organic-inorganic composite 13 may have a structure in which inorganic nanoparticles are distributed in a gel of inorganic oxide to form a complex with a polymer compound.

As a result, the organic-inorganic composite 13 may have a structure in which nanoscale inorganic particles 12 are dispersed in the organic polymer 11, and thereby, it may be utilized as a high refractive index optical material compared to a single material of the organic polymer 11.

The inorganic particles 12 may be distributed in the organic polymer 11 such that the content thereof continuously varies, and a boundary between regions in which different contents are distributed may be unclear. Additionally, the inorganic particles 12 may be distributed to have a tendency to increase or decrease in an arbitrary direction within the organic polymer 11. Additionally, the content of the inorganic particles 12 may also be distributed to increase and then decrease, or may be distributed to decrease and then increase the content of the inorganic particles 12.

The organic polymer 11 may contain an organic material having a high refractive index. For example, the organic polymer 11 may include any desired known plastic, and may include at least one or more of polyacrylic acid, polymethacrylic acid, polyacrylate, polymethacrylate, polymethylmetacrylate (PMMA), polyolefin, polystyrene, polyamide, polyimide, polyvinyl compounds such as polyvinyl chloride, polyvinyl alcohol, Polyvinyl butyral, Polyvinyl acetate, poly(ethylene-vinyl acetate), polyester, polyethylene terephthalate, polydiallyl phthalate, polycarbonate, polyether, polyoxymethylene, polyethylene oxide, polyether ketone, polysulfone, polyepoxide, fluoropolymer, polytetrafluoroethylene, and organopolysiloxane.

The inorganic particles 12 may include at least one or more of a compound capable of polycondensation by hydrolysis of silicon (Si), aluminum (Al), boron (B), lead (Pb), tin (Sn), titanium (Ti), zirconium (Zr), vanadium (V), tungsten (W), and zinc (Zn), in particular, a compound of silicon (Si), aluminum (Al), titanium (Ti) and zirconium (Zr), or a mixture thereof. For example, the inorganic particle 12 may also include at least one of zirconium oxide ($ZrO_2$), titanium oxide ($TiO_2$), zinc sulfide (ZnS), barium titanate ($BaTiO_3$), silicon (Si) crystalline, silicon (Si) amorphous, and tungsten oxide ($WO_3$), but other high refractive index nano-inorganic particles may be used without limitation.

In the example of the inorganic particles 12, an inorganic particle having a refractive index of 2.0 or higher may be used. Accordingly, since the refractive index distribution lens G according to the example may have a structure of the organic-inorganic composite 13 in which the inorganic particles 12 are dispersed in the organic polymer 11 as described above, an inclination of the refractive index may be controlled by controlling a volume ratio or a content of the inorganic particles 12. In an example, as the content of the inorganic particles 12 distributed in the organic-inorganic composite 13 increases, the refractive index of the refractive index distribution lens G may increase. Additionally, even in the same refractive index distribution lens G, a region in which the content of the inorganic particles 12 is high, may have a higher refractive index than other regions in which the content of the inorganic particles 12 is low.

In an example, with respect to the size of the inorganic particles 12, a diameter of the inorganic particles 12 may be 10 nm or less. When the diameter of the inorganic particles 12 is excessively large, the transmittance of the lens may be reduced due to a scattering phenomenon, and the inorganic particles 12 of the examples may be distributed within the organic polymer 11 while maintaining a small size.

Referring to FIG. 1, a subject may be disposed above, or in front of, the camera module 500A based on FIG. 1, and a structure, in which the refractive index distribution lens G1 is formed to increase the content of inorganic particles 12 from a first surface of the camera module, close to the subject, toward a second surface, farthest from the subject, and close to the imaging plane, is illustrated.

Accordingly, in the example of the refractive index distribution lens G1 of FIG. 1, a refractive index slope may be formed to increase the refractive index from a first surface, close to the subject, toward a second surface, farther from the subject. However, the refractive index distribution lens G according to the examples is not limited to this structure, and the distribution of the inorganic particles 12 may vary depending on the use and design.

In an example, the content of the inorganic particles 12 may be reduced from a first object-side surface of the refractive index distribution type lens G, close to the subject, to a second imaging-side surface, farther from the subject. In this example, a refractive index slope in which the refractive index decreases from a first surface, for example, an object-side surface, toward a second surface, for example, an imaging-side surface, of the refractive index distribution lens G may be formed.

Additionally, as another example, the content of the inorganic particles 12 may be formed to vary from a first surface of the refractive index distribution lens G, close to the subject, toward a second surface, farther from the subject, so that the content of inorganic particles 12 may have a maximum or minimum refractive index value, maximum in an arbitrary region between a first surface and a second surface. In this example, a refractive index slope may be formed to have a maximum or minimum refractive index value in an arbitrary region between one surface and the other surface of the refractive index distribution lens G.

In an example, a plurality of lenses L, other than the refractive index distribution lens G, may also include the organic-inorganic composite 13 described above. However, unlike the above-described refractive index distribution lens G, the inside of the lens L may have a constant refractive index regardless of the region.

In an example, referring to the enlarged view of each of FIGS. 1 and 2, it shows the disposition of the inorganic particles 12 inside the refractive index distribution lens G1. However, as shown, the inorganic particles 12 may be distributed while forming a layer, or the inorganic particles 12 may be distributed without forming a layer. In other words, a boundary may not be divided according to the content of the inorganic particles 12, and the inorganic particles 12 may be irregularly distributed with only a tendency of increasing or decreasing.

The refractive index distribution type lens G and/or the plurality of lenses L may be sequentially stacked in the interior of the lens barrel 10 to be configured to be sequentially stacked, and a spacer may be disposed between the refractive distribution lens G and/or the plurality of lenses L, to maintain a gap between the lenses and block unnecessary light. The spacer may be coated with a light blocking material or a light blocking film may be attached to block unnecessary light. Additionally, the spacer may be made of an opaque material. For example, the spacer may be made of a non-ferrous metal such as copper or aluminum.

FIG. 2 is a cross-sectional view of an camera module, in accordance with one or more embodiments.

Referring to FIG. 2, in the example of a camera module 500B according to one or more embodiments, compared to the camera module 500A according to an example of FIG. 1, the two camera modules 500A and 500B are different in that a plurality of refractive index distribution lenses G1 and G2 are disposed, and the lens L1 is disposed in a single number. Therefore, in the example, the above-described differences are mainly described, and a description of a configuration overlapping with the camera module 500A according to an example may be equally applied to the camera module 500B according to another example.

Referring to FIG. 2, in the example of the camera module 500B, a plurality of refractive index distribution lenses G1 and G2 may be disposed, and the description in the camera module 500A according to the example described above may be equally applied to the plurality of refractive index distribution lenses G1 and G2.

Additionally, in the example of FIG. 2, a structure in which a plurality of refractive index distribution lenses G1 and G2 are disposed in a position close to the subject, and the lens L1 is additionally disposed closer to the imaging plane is disclosed, but such a disposition is merely an example, and the plurality of refractive index distribution lenses G1 and G2 and the lens L1 may have an arbitrary dispositional relationship depending on the examples.

Additionally, a plurality of refractive index distribution lenses G1 and G2 of two layers may be disposed. However, this is only an example, and additional refractive index distribution lens G, greater than two, may be further disposed. By disposing the plurality of refractive index distributed lenses G1 and G2 as described above, various designs may be achieved, and the same refractive index difference can be maintained while further reducing the thickness compared to the example of using a single refractive index distribution type lens.

FIG. 3 illustrates a process of manufacturing a portion of lenses, in accordance with one or more embodiments.

Referring to FIG. 3, an organic polymer solution 11 and the highly concentrated nano-inorganic particle 12 may be applied on a substrate 14. Thereafter, by rotating the substrate 14 together with a heating process, a structure may be obtained in which the content distribution of the inorganic particles 12 in the organic-inorganic composite 13 of the refractive index distribution lens G according to the example is continuously disposed.

Compared with the typical method of compressing lenses having different refractive indices by pressing or laminating, the refractive index distribution type lens G according to the example may have a continuous distribution of inorganic particles 12. In the example of a structure in which a plurality of lenses are stacked, a phenomenon in which the lenses are separated may occur due to insufficient adhesion between the lenses, but in the example, the lenses are manufactured through the above-described method to form a single layer, so the adhesion problem may not occur.

Additionally, in the example of a structure in which a plurality of lenses are stacked, voids may be generated between the stacked lenses, so that the transmittance may be lowered. However, in the example, since the lenses are manufactured through the above-described method, a problem of occurring voids can be solved.

Figure 5:
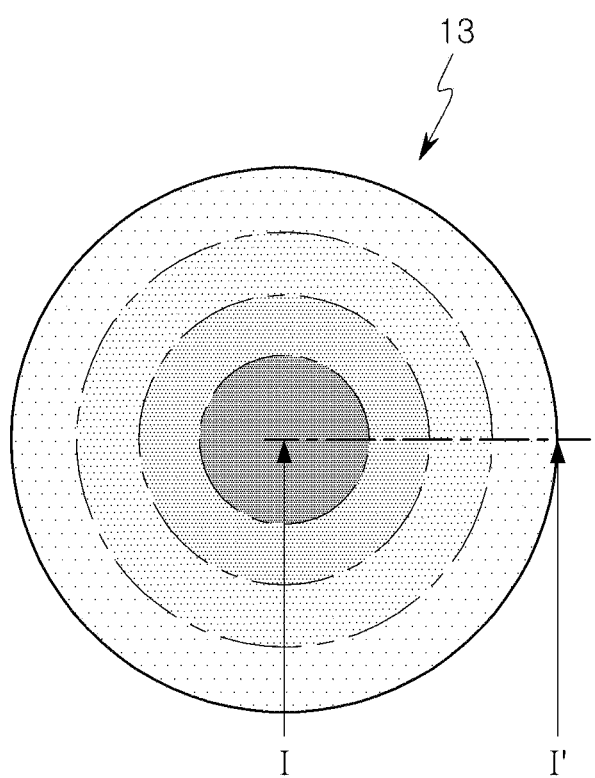
FIG. 5 is a plan view illustrating an upper surface of a lens, in accordance with the embodiment of FIG. 4.

FIG. 4 is a perspective view illustrating a part of an example lens, in accordance with one or more embodiments, and FIG. 5 is a plan view illustrating an upper surface of an example lens according to an example of FIG. 4.

FIGS. 4 and 5 illustrate a disposition of inorganic particles 12 in an organic-inorganic composite 13 constituting the refractive index distribution lens G. However, as shown, the inorganic particles 12 may be distributed while forming a layer, or the inorganic particles 12 may be distributed without forming a layer. In other words, a boundary may not be divided according to the content of the inorganic particles 12, and the inorganic particles 12 may be irregularly distributed in an organic polymer 11 while having only a tendency of increasing or decreasing.

Figure 6:
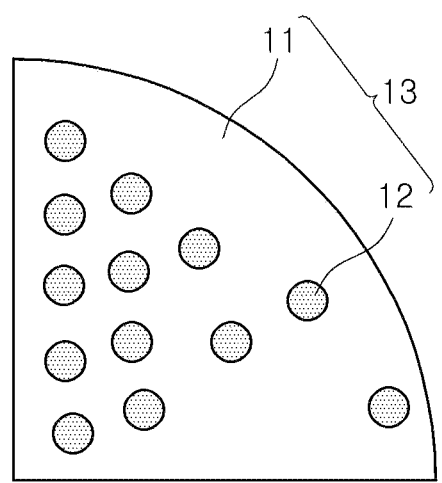
FIGS. 6 and 7 schematically illustrate an interior of a lens, in accordance with one or more embodiments, and are cross-sectional views I-I' of FIG. 5.
Figure 7:
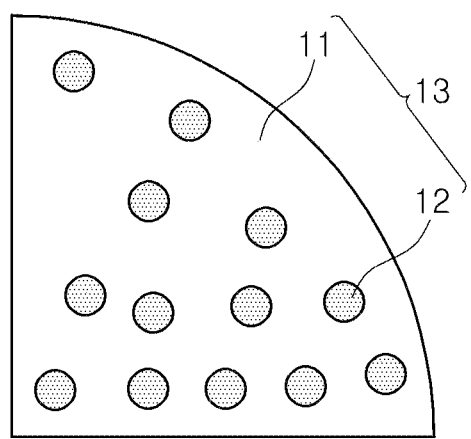

FIGS. 6 and 7 are cross-sectional views I-I' of FIG. 5 illustrating the disposition of inorganic particles 12 distributed in the organic polymer 11, respectively.

As shown in FIG. 6, the inorganic particles 12 may be distributed so that the content thereof decreases toward a side surface in the organic polymer 11, and the content of the inorganic particles 12 may be distributed so that the content thereof decreases toward an upper portion in the organic polymer 11 as shown in FIG. 7.

The distribution of the inorganic particles 12 disclosed in FIGS. 6 and 7 is a partial example, and as described above, the inorganic particles 12 may be disposed to increase or decrease in any direction while having the content that continuously changes in the organic polymer 11 according to the examples.

Through the above embodiments, the lens module according to the examples may prevent light incident into the lens module from being reflected on the inner surface of the lens barrel to cause a flare phenomenon.

Hereinafter, descriptions of overlapping contents are the same as those described above, and thus will be omitted.

As set forth above, as one effect among various effects of the example, an antenna module having an excellent heat dissipation effect may be provided.

As another effect among various effects of the example, an antenna module that effectively reduces signal interference may be provided.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module, comprising:
at least one refractive index distribution lens; and
a lens barrel, configured to accommodate the at least one refractive index distribution lens,
wherein the at least one refractive index distribution lens is composed of a single layer, and comprises a plastic material,
an organic polymer and inorganic particles, and
wherein a distribution of all of the inorganic particles decreases toward a side portion of the organic polymer and an upper portion of the organic polymer.

2. The lens module of claim 1, wherein a maximum refractive index of the at least one refractive index distribution lens is equal to or greater than 1.75.

3. The lens module of claim 2, wherein a difference between a maximum refractive index and a minimum refractive index of the at least one refractive index distribution lens is equal to or greater than 0.2.

4. The lens module of claim 1, wherein the organic polymer comprises at least one of polycarbonate (PC) and polymethylmetacrylate (PMMA).

5. The lens module of claim 1, wherein a refractive index of the inorganic particles is equal to or greater than 2.0.

6. The lens module of claim 5, wherein a diameter of the inorganic particles is less than or equal to 10 nm.

7. The lens module of claim 6, wherein the inorganic particles comprise at least one or more of $ZrO_2$, $TiO_2$, ZnS, $BaTiO_3$, Si, and $WO_3$.

8. The lens module of claim 1, wherein a content distribution of the inorganic particles is continuously changed within the at least one refractive index distribution lens.

9. The lens module of claim 1, wherein the at least one refractive index distribution lens has a continuously changed refractive index.

10. The lens module of claim 1, wherein the at least one refractive index distribution lens has a continuously increased, or continuously decreased, refractive index.

11. The lens module of claim 10, further comprising a plurality of lenses configured to be accommodated in the lens barrel.

12. The lens module of claim 11, wherein at least one of the plurality of lenses comprises an organic polymer and inorganic particles.

13. The lens module of claim 1, wherein a refractive index of the refractive index distribution lens varies in an optical axis direction.

14. A camera module, comprising:
a lens barrel, configured to accommodate at least one refractive index distribution lens;
a housing, including the lens barrel; and
an image sensor module, coupled to the housing,
wherein the at least one refractive distribution lens is composed of a single layer, and comprises a plastic material,
an organic polymer and inorganic particles, and
wherein a distribution of all of the inorganic particles decreases toward a side portion of the organic polymer and an upper portion of the organic polymer.

15. The camera module of claim 14, wherein the at least one refractive index distribution lens has a continuously changed refractive index.

16. The camera module of claim 14, wherein a refractive index of the refractive index distribution lens varies in an optical axis direction.

17. An electronic device, comprising:
   a camera module, comprising:
      a housing;
      at least one single-layer refractive index distribution lens disposed in the housing; and
      at least one lens disposed in the housing;
      wherein the at least one refractive index distribution lens comprises a plastic material,
      an organic polymer and inorganic particles, and
      wherein a distribution of all of the inorganic particles decreases toward a side portion of the organic polymer and an upper portion of the organic polymer.

18. The electronic device of claim 17, wherein the at least one refractive index distribution lens is disposed at an object-side surface of the camera module, and the at least one lens is disposed at an image-side surface of the camera module.

19. The electronic device of claim 17, wherein a refractive index of the refractive index distribution lens varies in an optical axis direction.

\* \* \* \* \*